United States Patent
Visser

(10) Patent No.: US 7,307,979 B2
(45) Date of Patent: Dec. 11, 2007

(54) CONFIGURATION ROLLBACK

(75) Inventor: Lance A. Visser, Dallas, TX (US)

(73) Assignee: Jeremy Benjamin as Receiver for Chiaro Networks Ltd, Tel Aviv (IL)

( * ) Notice: Subject to any disclaimer, the term of this patent is extended or adjusted under 35 U.S.C. 154(b) by 1057 days.

(21) Appl. No.: 10/210,414

(22) Filed: Jul. 31, 2002

(65) Prior Publication Data

US 2004/0032837 A1 Feb. 19, 2004

(51) Int. Cl.
*H04L 12/28* (2006.01)
*G06F 9/44* (2006.01)
*G06F 15/177* (2006.01)
*G06F 17/30* (2006.01)

(52) U.S. Cl. .............. 370/351; 717/121; 717/170; 709/221; 707/203

(58) Field of Classification Search .......... 370/351, 370/381, 410, 426, 389; 717/121, 170, 168, 717/174; 709/220, 221; 713/100; 707/203
See application file for complete search history.

(56) References Cited

U.S. PATENT DOCUMENTS

| | | | | |
|---|---|---|---|---|
| 5,359,730 A | * | 10/1994 | Marron | 717/169 |
| 5,410,703 A | * | 4/1995 | Nilsson et al. | 717/168 |
| 6,256,773 B1 | * | 7/2001 | Bowman-Amuah | 717/121 |
| 6,360,363 B1 | * | 3/2002 | Moser et al. | 717/170 |
| 6,704,752 B1 | * | 3/2004 | Kathail et al. | 707/202 |
| 6,996,817 B2 | * | 2/2006 | Birum et al. | 717/170 |
| 2004/0148369 A1 | * | 7/2004 | Strassner | 709/221 |

OTHER PUBLICATIONS

U.S. Appl. No. 09/703,057, Brewer et al.
U.S. Appl. No. 09/852,223, Watson et al.

* cited by examiner

*Primary Examiner*—Doris H. To
*Assistant Examiner*—Kerri M Rose
(74) *Attorney, Agent, or Firm*—Harold L. Novick; The Nath Law Group

(57) ABSTRACT

A router rolls back a current running configuration to a selected prior running configuration without requiring interruption or reinitialization of the router or of its network connections. The router retrieves command line interface control settings associated with the selected prior running configuration and those associated with the current running configuration. The router then generates and executes a rollback script based on the difference between the prior control settings and the current control settings.

19 Claims, 2 Drawing Sheets

CONFIGURATION ROLLBACK

CROSS-REFERENCE TO RELATED APPLICATIONS

The present application is related to commonly assigned U.S. application Ser. No. 09/703,057, entitled "SYSTEM AND METHOD FOR IP ROUTER WITH AN OPTICAL CORE," filed Oct. 31, 2000, now abandoned; and to commonly assigned U.S. application Ser. No. 09/852,223, entitled "SYSTEM AND METHOD FOR TCP CONNECTION PROTECTION SWITCHING," filed May 9, 2001, issued as U.S. Pat. No. 6,853,617; the disclosures of which are hereby incorporated herein by reference.

TECHNICAL FIELD

The invention relates to network routers, and more particularly to configuration rollback in network routers.

BACKGROUND OF THE INVENTION

FIG. 1 is a simplified block diagram schematically representing a typical prior art network router 10. Packet forwarding router 10 includes two major subsystems: control plane 12 and data plane 11. Data plane 11 provides the packet forwarding function in interfaces 14 for store-and-forward transit packets. This subsystem relies on a packet forwarding "look-up" table that is created and maintained by control plane 12. The forwarding table instructs data plane 11 where to forward each received packet. Control plane 12 creates the packet forwarding table using information from various sources, including static configuration and dynamic information learned from peer network routers through connections 15-1 through 15-N and interfaces 14, and communicates the forwarding tables to interfaces 14.

In prior art systems, command line interface (CLI) 13 is a text-based system associated with control plane 12 for applying configuration changes to a router's operational state. The router's operational state at any particular time can be queried and displayed as the set of text-based configuration commands that would place a newly started router with no operational state into its current operational state. CLI 13 also provides the ability to execute a sequence of text-based configuration commands. For example:

ip activate-fsdm
router jsam 22
peer 1.2.3.4
end
tcp enable-wdsm (Note that in this and following examples fsdm and wsdm are artificial commands solely for the purpose of illustrating the configuration rollback process.)

Text-based configuration commands have a "positive" form (a command that activates a particular operational state attribute) and a "negative" form (a command that turns off a particular operational state attribute). The "negative" form of the configuration command is written as the positive form of the command with the keyword "no" prepended to the text. For example:

(positive-form) "ip activate-fsdm"
(negative-form) "no ip activate-fsdm"

CLI 13 also has commands within its command structure belonging to particular configuration "levels". A configuration level is entered by execution of a "level-command" in CLI 13. After entering a configuration level, a user obtains access to "level-specific-commands" associated with that specific level. A configuration level is exited by executing a level-exit command to enter an operational state, known as "base-command-level," from which the user either can enter another configuration level or can access a set of base-level configuration commands directly without entering another level. For example:

(level-command) routerjsam 22
(level-specific-command) peer 1.2.3.4
(level-exit-command) end Prior art routers are typically configured using a configuration file. To roll back the configuration, in other words to move the router from one configuration in time with one set of operating parameters to another by issuing a single command involved an internal database. To accomplish the rollback required completely reinitializing the router in most respects and reprocessing all of the configuration commands, in effect wiping the slate clean of the current configuration, and then rolling back to the previous configuration.

Prior art solutions are very complex and very difficult to implement, intrusive into software, and very cumbersome to maintain correctly over time. Nevertheless, many users liked the configuration rollback feature on routers. Historically, in the telecommunication industry, the ability to roll back quickly to a previous configuration appears, for example, on PBXs and telephone equipment in some form, but not in a form specifically applicable for routers.

It would therefore be desirable to wipe this slate clean without the router ceasing to operate, thereby eliminating everything that the router currently knows about it's configuration and putting something new in its place, without damaging or interrupting the router in its current operation.

Almost every installed router has a running configuration file of some sort. Accordingly, it would be desirable to provide a configuration rollback process compatible with a large population base of installed routers, that does not require rebooting or interrupting the router or its connections with peer network routers.

BRIEF SUMMARY OF THE INVENTION

The present invention is directed to a system and method which enable a router to roll back a current running configuration to a selected prior running configuration of the router without requiring interruption or reinitialization of the router or of its network connections. In accordance with embodiments of the present invention, the router retrieves command line interface control settings associated with the selected prior running configuration and those associated with the current running configuration. The router then generates and executes a rollback script based on the difference between the prior control settings and the current control settings.

The embodiments of the invention essentially create a set of commands that are independent of the running configuration files. This involves transforming the running configuration files into a different "rollback-running-configuration" format in which a very simple text difference operation generates a rollback script. That difference, the commands that were in the previous running configuration file or commands that are in the new configuration file but are not in the previous one, includes the commands that undo the current running configuration and the added commands that are needed to roll back to the selected previous running configuration.

In the special "rollback-running-configuration" format, the level-command required to enter each level is written explicitly on the same line of text as the configuration command to be executed. The current running-configuration is saved to a file "b", and the selected prior running configuration is saved to a file "a". Then command lines present in file "a" but not in file "b" are stored in sequence to a file "c". Similarly, lines of text present in file "b" but not in file "a" are stored in sequence to a file "d". Lines of text that are identical in files "a" and "b" are discarded. Then to create the rollback script all positive commands are converted to negative and all negative commands are converted to positive in file "d", the sequence of text lines in file "d" is reversed, and the text lines of file "c" are appended in original sequence to the resulting reversed text lines of file "d". This rollback script file is then transformed back into the original command line format and is executed to roll back the router running configuration without disruption of router operation or connections with network routers.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Configuration rollback in accordance with embodiments of the present invention provides a process to change the running configuration (control settings) of a router to a prior running configuration without rebooting the router or interrupting its operation. The configuration rollback process retrieves the current running configuration and a selected prior running configuration of the router, and generates from a specially formatted difference of the two configurations a script that when executed by the router will seamlessly restore the router's selected prior running configuration.

Figure 1:
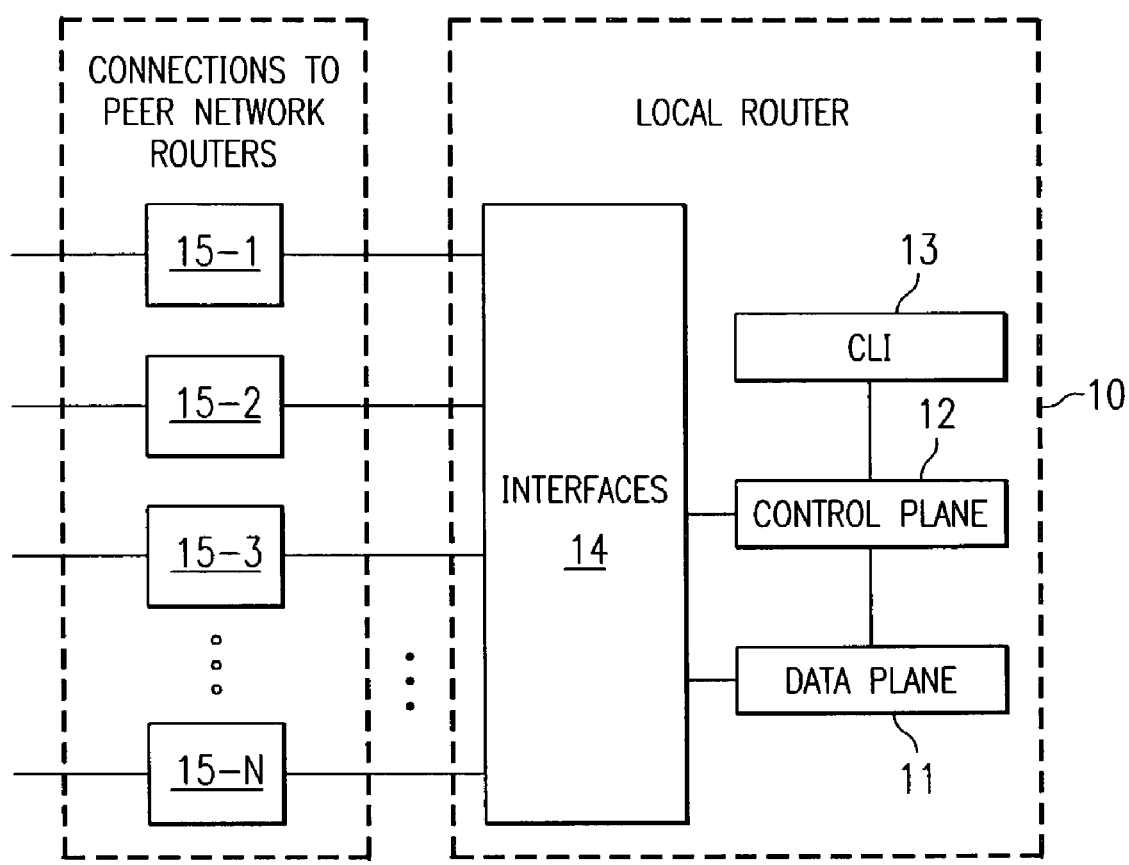
FIG. 1 is a simplified block diagram schematically representing a typical prior art network router.
Figure 2:
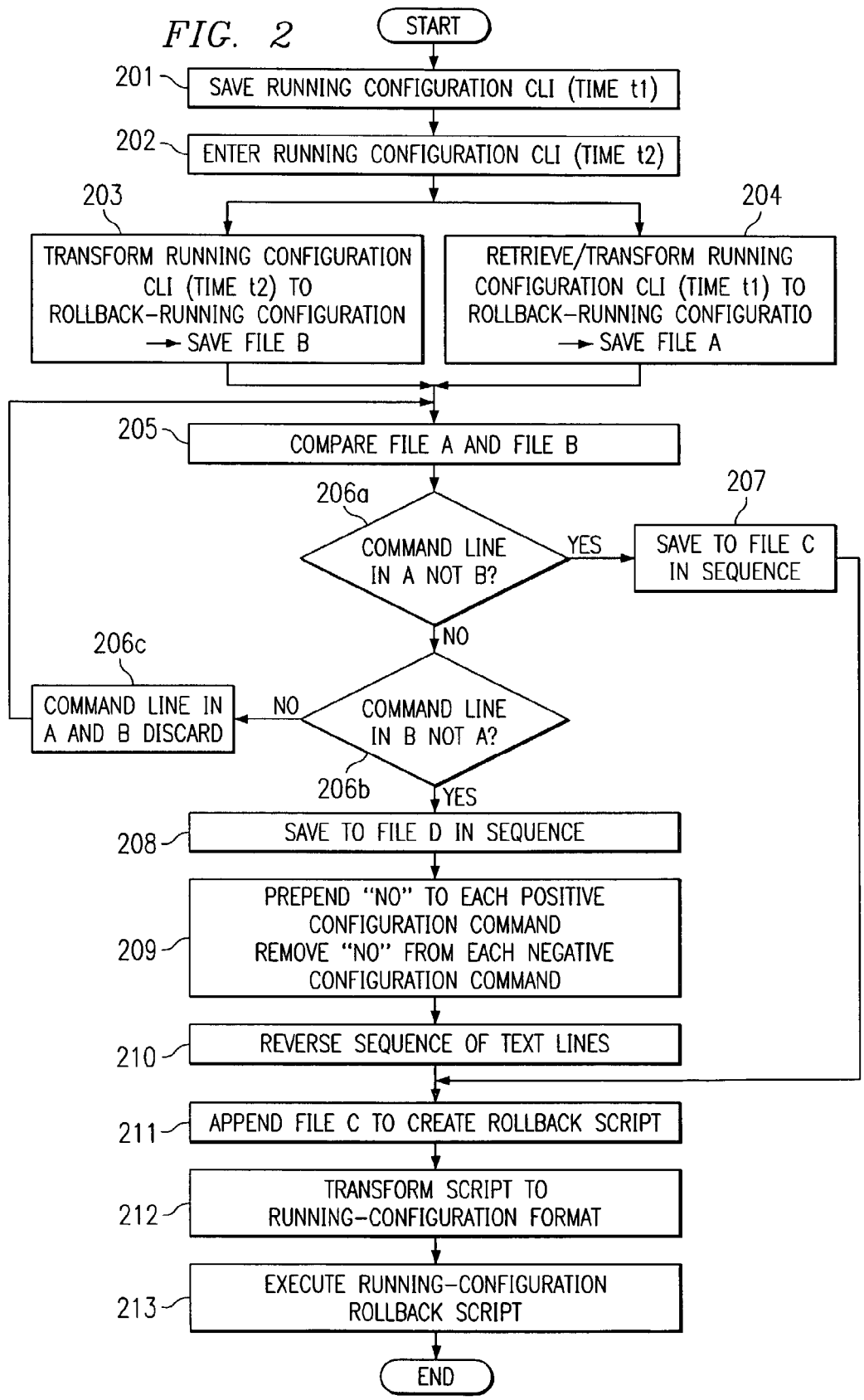
FIG. 2 is a flow diagram depicting the operation of an algorithm for performing configuration rollback, in accordance with embodiments of the present invention.

FIG. 2 is a flow diagram depicting the operation of an algorithm for performing configuration rollback, in accordance with embodiments of the present invention. At step 201, the configuration rollback process saves at time (t1) the running configuration at CLI 13. At a future time (t2), as depicted at step 202, the current running configuration at CLI 13 is entered.

For all configuration rollback operations, the running configuration is transformed and displayed at CLI 13 in a special "rollback-running-configuration" format, in which the level-command required to enter each level is written explicitly on the same line of text as the configuration command to be executed, in the order <level-command><delimiter><real-command> for example:
    base-command-level; ip activate-fsdm
    routerjsam 22; peer 1.2.3.4
    base-command-level; tcp enable-wdsm In the above example, the semicolon (;) is a "delimiter." Configuration commands without a level-command are prepended with "base-command-level". A running configuration saved in this format is called the "rollback-running-configuration".

Referring again to FIG. 2, the current running-configuration entered at step 202 at time (t2) is transformed to the rollback-running-configuration format at step 203 and is saved to a file "b". The selected prior running configuration saved at time (t1) is transformed to the rollback-running-configuration format at step 204 and is saved to a file "a". In some embodiments, the respective running-configurations are transformed to rollback-running-configuration format prior to saving and entering at steps 201 and 202 respectively, such that step 201 and step 204 are combined together, and/or step 202 and step 203 are combined together. Next, at step 205 files "a" and "b" are compared, and the lines of text that differ between file "a" and file "b" are recorded. At step 206a, command lines present in file "a" but not in file "b" are stored in sequence at step 207 to a file "c". At step 206b, lines of text present in file "b" but not in file "a" are stored in sequence at step 208 to a file "d". At step 206c, lines of text that are identical in files "a" and "b" are discarded, after which the algorithm returns to step 205 to compare the next text command lines, until all of the lines have been compared.

At step 209, the "no" keyword is then prepended in front of each configuration command to create negative commands in file "d". If a configuration command already starts with a "no", then the "no" keyword is removed (two "no"s become a positive command). File "d" represents the commands which must be undone (negative) in order to roll back from current configuration (t2) to selected prior configuration (t1). File "c" represents the commands that must be executed (positive) to roll back to prior configuration (t1).

A rollback-command-script is then constructed by combining files "c" and (negative) "d" in the following prescribed manner:

First, at step 210, the sequence of the text lines in file "d" is reversed. The normal order of lines in a configuration file has objects being created and then having attributes assigned to them, for example:

```
router bgp 10
    neighbor 1.2.3.4 remote-as 33
    neighbor 1.2.3.4 local as 4
!
transforms to:
no router bgp 10
!
router bgp 10
    no neighbor 1.2.3.4 remote-as 33
!
router bgp 10
    no neighbor 1.2.3.4 local as 4
!
```

These lines must be reversed in file "d" in order not to destroy the object (e.g., no router bgp10) before first destroying the commands that set up attributes within the object (e.g., the "neighbor" commands in the above example). Otherwise, when "no router bgp 10" is processed, the "router bgp" object is gone from the configuration. However, if the file is reversed, for example:

```
router bgp 10
    no neighbor 1.2.3.4 remote-as 4
!
router bgp 10
    no neighbor 1.2.3.4 local as 33
!
no router bgp 10
```

The attributes are removed in proper sequence before the configuration object is removed, and the rollback proceeds correctly.

Then, at step 211, the text lines of file "c" are appended in original sequence to the resulting reversed text lines of file "d".

The resulting rollback-command-script resulting from step 211 is then transformed back at step 212 into a normal running-configuration file format. Finally, at step 213, the rollback-command-script transformed into normal running-configuration file format is executed to restore the router system to the selected prior time (t1) operational state.

An example of the command line interface (CLI) during the configuration rollback process is shown below:
Running-configuration CLI (time t1):
    ip activate-fsdm
    router jsam 22
    peer 1.2.3.4
    end
    tcp enable-wdsm
Rollback-configuration (time t1):
    base-command; ip activate-fsdm
    routerjsam 22; peer 1.2.3.4
    base-command; tcp enable-wdsm
Running-configuration (time t2):
    ip activate-fsdm
    allow-tunnel-broadcasts
Rollback configuration (time t2):
    base-command; ip activate-fsdm
    base-command; allow-tunnel-broadcasts
Performing the difference operation:
    file (c)
    router jsam 22; peer 1.2.3.4
    base-command; tcp enable-wdsm
    file (d)
    base-command; allow-tunnel-broadcasts
Performing the negative transform operation:
    file (d)
    base-command; no allow-tunnel-broadcasts
Constructing the rollback-command-script:
    base-command; no allow-tunnel-broadcasts
    router jsam 22; peer 1.2.3.4
    base-command; tcp enable-wdsm
Transforming the rollback command script into a normal running-configuration format file:
    no allow-tunnel-broadcasts
    router jsam 22
    peer 1.2.3.4
    end
    tcp enable-wdsm The script created in the previous step is executed to roll the system back to the selected prior operational state at time t1.

Configuration rollback as described can be implemented in hardware and/or software utilizing a parser, and is currently implemented in the Chiaro routing software known as "p2d" using MRT (multithreaded routing toolkit) parser. P2d is implemented as an operating system process, which spawns a shell script process in the operating system to perform the difference operation on the running configuration.

Configuration "rollback" allows the user to undo a series of CLI commands (only the ones covered by the current running-configuration file) to "roll back" the configuration to a selected prior configuration. In the present implementation, "rollback" utilizes symmetry in commands (putting a "no" in front of the command creates a command that undoes the command). If a "no" command appears in the "difference", the code doing the difference operation knows to transform "no no<cmd>" into a positive command "<cmd>". Other implementations may utilize a different syntax.

In the p2d implementation, the user saves the current "running-configuration" in "rollback" format, which is an alternate format of display for a running configuration that puts the level command necessary to get to the proper "level" to execute an individual configuration command on the same line of text with that respective configuration command. For example:

```
CLI running configuration format:
interface 1o0
    mtu 1500
    ip address 1.2.3.4/24
!
router bgp 300
    neighbor 1.2.3.4 remote-as 33
!
``` in which the command character "!" forces a return to base-command-level.
    Selected prior rollback-running-configuration:
    a. interface 1o0; mtu 1500
        interface 1o0; ip address 1.2.3.4/24
        router bgp 300
        router bgp 300; neighbor 1.2.3.4 remote-as 33
    Current rollback-running-configuration:
    b. interface 1o0; shutdown:
        router bgp 300
        router bgp 300; bgp always-compare-med in which the appropriate level-command precedes the delimiter in the same text line in front of each configuration command. In the example, note that "router bgp 300" performs both configuration command and level-command functions.

The "rollback-running-configuration format" is used in performing a "difference" operation between two running configurations (the current running-configuration and the selected prior running-configuration to "roll back" to). When rolling back, text lines that are in the current running configuration but not the prior running-configuration are converted into "no" commands and reversed in sequence. Commands that are in the prior running-configuration but not the current running configuration are added unchanged in sequence.

"Difference" files:
   c. interface 1o0; mtu 1500
      interface 1o0; ip address 1.2.3.4/24
      router bgp 300; neighbor 1.2.3.4 remote-as 33
   d. interface 1 o0; shutdown
      router bgp 300; bgp always-compare-med
Rollback-command-script:
      router bgp 300; no bgp always-compare-med
      interface 1o0; no shutdown
      interface 1o0; mtu 1500
      interface 1o0; ip address 1.2.3.4/24
      router bgp 300; neighbor 1.2.3.4 remote-as 33
In the final step, the rollback-command-script is translated back to normal running-configuration format and executed:

```
router bgp 300
    no bgp always-compare-med
!
interface 1o0
    no shutdown
!
interface 1o0
    mtu 1500
    ip address 1.2.3.4/24
!
router bgp 300
    neighbor 1.2.3.4 remote-as 33
```

Configuration rollback commands in p2d software implementation include the following:
   rollback save [name]
No parameter means create a time-based rollback file. Otherwise "name" is used for the rollback file.
   config rollback [name | number]
If no parameters are given, it rolls back to the most recent time-based rollback file. Otherwise, it finds the rollback file with the given name or one with a "number" as displayed by the "show rollback-config" command.
   show rollback-config
      This command displays all of the currently saved rollback configuration files plus various state information (such as commit timers) associated with rollback.
   rollback-delete [name | number]
      This is used to delete rollback configuration files. If a name or number is given, that rollback configuration point is removed from the system.
   show config rollback [name | number]
      This command displays the script that would be executed to perform the rollback without actually executing the rollback. It allows the user to see what will happen before actually executing the rollback.
   commit
      This command halts the rollback timer started when "start-config" was entered.
   [no] rollback commit-timeout <seconds>
      This command controls the value of the rollback timeout set by the start-config command.
   [no] start-config
      This command starts a configuration session in which an automatic rollback will be scheduled in the future unless the user executes the "commit" command. It automatically creates a time-based rollback configuration file in the system, such that the rollback (based on a timer) will always come back to the point where start-config was typed.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of rolling back a current running configuration of a router having a command line interface to a selected prior running configuration of said router without requiring interruption or reinitialization of said router or of its network connections, said method comprising the steps of:
   retrieving first control settings of said router associated with said selected prior running configuration;
   retrieving second control settings of said router associated with said current running configuration;
   generating a rollback script including a difference operation based on a difference between said first control settings and said second control settings; and
   executing said rollback script, the execution implemented as an operating system process without rebooting the router or interrupting its operation, which spawns a shell script process in the operating system to perform the difference operation on the running configuration.

2. The method of claim 1 wherein said first control settings comprise at least one first text line of configuration commands at said command line interface and wherein said second control settings comprise at least one second text line of configuration commands at said command line interface.

3. The method of claim 2 wherein said at least one first text line of configuration commands comprises at least one first level-specific configuration command and at least one first level-command, such that said at least one first level-specific configuration command is accessed from a first configuration level, said first configuration level being entered by execution of one of said at least one first level-commands.

4. The method of claim 3 wherein said at least one second text line of configuration commands comprises at least one second level-specific configuration command and at least one second level-command, such that said at least one second level-specific configuration command is accessed from a second configuration level, said second configuration level being entered by execution of one of said at least one second level-commands.

5. The method of claim 1 implemented in a medium selected from the group consisting of hardware and software, as said operating system process, which spawns a shell script process in the operating system to perform the difference operation on the running configuration.

6. The method of claim 5 wherein said method utilizes a parser.

7. The method of claim 1 wherein said operating system process includes a) a command that provides an ability to display to a user CLI commands that would be executed as a result of a rollback operation;
b) commands that provide an ability to force an automatic router configuration rollback after a specified time interval, unless said user enters a command to stop said automatic rollback; and
c) commands that provide said user an ability to create, delete or display saved rollback configuration files.

8. The method of claim 1 wherein said operating system process includes:
a) an operating system process, which spawns a shell script process in the operating system to perform the difference operation on the running configuration;
b) a command that provides an ability to display to a user CLI commands that would be executed as a result of a rollback operation;
c) commands that provide an ability to force an automatic router configuration rollback after a specified time interval, unless said user enters a command to stop said automatic rollback; and
d) commands that provide said user an ability to create, delete or display saved rollback configuration files.

9. A method of rolling back a current running configuration of a router having a command line interface to a selected prior running configuration of said router without requiring interruption or reinitialization of said router or of its network connections, said method comprising the steps of:
retrieving first control settings of said router associated with said selected prior running configuration;
retrieving second control settings of said router associated with said current running configuration;
generating a rollback script based on a difference between said first control settings and said second control settings; and
executing said rollback script,
wherein said step of generating further comprises the steps of
transforming said first control settings, such that each of said at least one first text lines of configuration commands is rewritten into a format wherein each of said first level-specific configuration commands is prepended in the same line of text with a delimiter, which is prepended in the same line of text with said first level-command for entering said first configuration level from which said first level-specific configuration command is accessed, wherein each said first text line comprising a configuration command without a level-command is prepended in said first text line with said delimiter, which is prepended with a base-command-level command, transforming said second control settings, such that each of said at least one second text lines of configuration commands is rewritten into a format wherein each of said second level-specific configuration commands is prepended in the same line of text with a delimiter, which is prepended in the same line of text with said second level-command for entering said second configuration level from which said second level-specific configuration command is accessed, wherein each said second text line comprising a configuration command without a level-command is prepended in said second text line with said delimiter, which is prepended with a base-command-level command, storing in sequence in a first file any of said lines of text that are present in said transformed first control settings but are not present in said transformed second control settings, storing in sequence in a second file any of said lines of text that are present in said transformed second control settings but are not present in said transformed first control settings, discarding any of said lines of text that are present in both said transformed first control settings and said transformed second control settings, in all of said lines of text in said second file, converting any positive configuration commands into negative configuration commands and converting any negative configuration commands into positive configuration commands, reversing the sequence of all of said lines of text in said second file, appending all of said lines of text in said first file in sequence to said reversed sequence lines of text in said second file, and transforming the result of said appending into the original format of said control settings;
and wherein said at least one first text line of configuration commands comprises at least one first level-specific configuration command and at least one first level-command, such that said at least one first level-specific configuration command is accessed from a first configuration level, said first configuration level being entered by execution of one of said at least one first level-commands;
and wherein said at least one second text line of configuration commands comprises at least one second level-specific configuration command and at least one second level-command, such that said at least one second level-specific configuration command is accessed from a second configuration level, said second configuration level being entered by execution of one of said at least one second level-commands.

10. A network including a router, said router operable to roll back a current running configuration to a selected prior running configuration of said router without requiring interruption or reinitialization of said router or of said router's network connections, said router comprising
a data plane including data interfaces;
a control plane comprising a command line interface; and
connections to peer network routers, said connections coupled with said data interfaces, said router operable to retrieve first control settings of said router associated with said selected prior running configuration, retrieve second control settings of said router associated with said current running configuration, generate a rollback script including a difference operation based on a difference between said first control settings and said second control settings, and execute said rollback script without rebooting the router or interrupting its operation, the execution implemented as an operating system process, which spawns a shell script process in the operating system to perform the difference operation on the running configuration.

11. The network of claim 10 wherein said router includes a processor operable to run routing software.

12. The network of claim 10 wherein said operating system process includes
a) a command that provides an ability to display to a user CLI commands that would be executed as a result of a rollback operation;
b) commands that provide an ability to force an automatic router configuration rollback after a specified time interval, unless said user enters a command to stop said automatic rollback; and
c) commands that provide said user an ability to create, delete or display saved rollback configuration files.

13. The network of claim 10 wherein said router includes a parser.

14. The network of claim 10 wherein said first control settings comprise at least one first text line of configuration commands at said command line interface and wherein said second control settings comprise at least one second text line of configuration commands at said command line interface.

15. The network of claim 14 wherein said at least one first text line of configuration commands comprises at least one first level-specific configuration command and at least one first level-command, such that said at least one first level-specific configuration command is accessed from a first configuration level, said first configuration level being entered by execution of one of said at least one first level-commands; and said at least one second text line of configuration commands comprises at least one second level-specific configuration command and at least one second level-command, such that said at least one second level-specific configuration command is accessed from a second configuration level, said second configuration level being entered by execution of one of said at least one second level-commands.

16. The network of claim 15 wherein said router is operable to transform said first control settings, such that each of said at least one first text lines of configuration commands is rewritten into a format wherein each of said first level-specific configuration commands is prepended in the same line of text with a delimiter, which is prepended in the same line of text with said first level-command for entering said first configuration level from which said first level-specific configuration command is accessed, wherein each said first text line comprising a configuration command without a level-command is prepended in said first text line with said delimiter, which is prepended with a base-command-level command;

transform said second control settings, such that each of said at least one second text lines of configuration commands is rewritten into a format wherein each of said second level-specific configuration commands is prepended in the same line of text with a delimiter, which is prepended in the same line of text with said second level-command for entering said second configuration level from which said second level-specific configuration command is accessed, wherein each said second text line comprising a configuration command without a level-command is prepended in said second text line with said delimiter, which is prepended with a base-command-level command;

store in sequence in a first file any of said lines of text that are present in said transformed first control settings but are not present in said transformed second control settings;

store in sequence in a second file any of said lines of text that are present in said transformed second control settings but are not present in said transformed first control settings;

discard any of said lines of text that are present in both said transformed first control settings and said transformed second control settings; and in all of said lines of text in said second file, convert any positive configuration commands into negative configuration commands and convert any negative configuration commands into positive configuration commands, reverse the sequence of all of said lines of text in said second file, append all of said lines of text in said first file in sequence to said reversed sequence lines of text in said second file, and transform the result of said appending into the original format of said control settings.

17. A method of rolling back a current running configuration of a router having a command line interface to a selected prior running configuration of said router without requiring interruption or reinitialization of said router or of its network connections, said method comprising the steps of:

retrieving first control settings of said router associated with said selected prior running configuration;

retrieving second control settings of said router associated with said current running configuration;

generating a configuration rollback script and a selected prior running configuration of the router based on a difference between said first control settings and said second control settings; and executing said rollback script to roll back the router running configuration without disruption of router operation or connections with network routers.

18. The method of claim 17 wherein said first control settings comprise at least one first text line of configuration commands at said command line interface and wherein said second control settings comprise at least one second text line of configuration commands at said command line interface.

19. The method of claim 18 wherein:

said at least one first text line of configuration commands comprises at least one first level-specific configuration command and at least one first level-command, said at least one first level-specific configuration command accessed from a first configuration level, said first configuration level entered by execution of one of said at least one first level-commands; and said at least one second text line of configuration commands comprises at least one second level-specific configuration command and at least one second level-command, said at least one second level-specific configuration command accessed from a second configuration level, said second configuration level entered by execution of one of said at least one second level-commands.

* * * * *